United States Patent
Narasimhan et al.

(10) Patent No.: US 9,596,513 B2
(45) Date of Patent: Mar. 14, 2017

(54) METHOD AND SYSTEM FOR FACILITATING DEMAND-DRIVEN DISTRIBUTION OF CONTENT

(71) Applicant: Google Technology Holdings LLC, Mountain View, CA (US)

(72) Inventors: Nitya Narasimhan, Hopewell Junction, NY (US); Harry Bliss, Evanston, IL (US); Joseph Wodka, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 39 days.

(21) Appl. No.: 14/455,671

(22) Filed: Aug. 8, 2014

(65) Prior Publication Data

US 2014/0351839 A1    Nov. 27, 2014

Related U.S. Application Data

(63) Continuation of application No. 13/101,904, filed on May 5, 2011, now Pat. No. 8,806,545.

(51) Int. Cl.
*G06F 3/00* (2006.01)
*G06F 13/00* (2006.01)
(Continued)

(52) U.S. Cl.
CPC ...... *H04N 21/47202* (2013.01); *H04H 20/38* (2013.01); *H04H 60/31* (2013.01);
(Continued)

(58) Field of Classification Search
CPC ........... H04N 21/4532; H04N 5/44543; H04N 21/44222; H04N 7/163; H04N 21/482
(Continued)

(56) References Cited

U.S. PATENT DOCUMENTS 6,651,253 B2 * 11/2003 Dudkiewicz ...... G06F 17/30017
                                                       348/E5.006
7,363,243 B2    4/2008 Arnett et al.
(Continued)

OTHER PUBLICATIONS

CableLabs, "Metadata Specifications: ADI 2.0 Specification Asset Inventory Message", Technical Paper, Apr. 21, 2011, pp. 1-4.
(Continued)

*Primary Examiner* — Jason Salce
(74) *Attorney, Agent, or Firm* — Byrne Poh LLP (57) ABSTRACT

Methods and systems for facilitating distribution of content are disclosed. In one example embodiment, a method of facilitating demand-driven population and management of online content within a video-on-demand (VOD) service includes receiving trend information and a link reference at one or more input ports, the reference being at least indirectly indicative of a location at which the content is available, and obtaining and normalizing, by way of one or more processing devices, metadata pertaining to the content. The method further includes determining business rule information pertaining to the content based at least indirectly upon the trend information, content provider policy information, and the normalized metadata, via the processing device(s), and outputting via one or more output ports the business rule information for receipt by the VOD service, whereby availability and prioritization of the content at the VOD service is based at least in part upon the output business rule information.

21 Claims, 4 Drawing Sheets

(51) Int. Cl.
*H04N 5/445* (2011.01)
*H04N 21/472* (2011.01)
*H04H 20/38* (2008.01)
*H04H 60/31* (2008.01)
*H04H 60/65* (2008.01)
*H04H 60/73* (2008.01)
*H04N 21/24* (2011.01)
*H04N 21/258* (2011.01)

(52) U.S. Cl.
CPC ............ *H04H 60/65* (2013.01); *H04H 60/73* (2013.01); *H04N 21/2408* (2013.01); *H04N 21/25891* (2013.01)

(58) Field of Classification Search
USPC ...................................................... 725/45–46
See application file for complete search history.

(56) References Cited

U.S. PATENT DOCUMENTS

| | | | |
|---|---|---|---|
| 7,600,017 | B2 | 10/2009 | Holtzman et al. |
| 7,720,835 | B2 | 5/2010 | Ward et al. |
| 2002/0186844 | A1 | 12/2002 | Levy et al. |
| 2004/0055014 | A1 | 3/2004 | Edelson |
| 2004/0103120 | A1 | 5/2004 | Fickle et al. |
| 2006/0150216 | A1* | 7/2006 | Herz .................... G06Q 20/383 725/50 |
| 2008/0010379 | A1 | 1/2008 | Zhao |
| 2008/0046929 | A1 | 2/2008 | Cho et al. |
| 2008/0285578 | A1 | 11/2008 | Delay et al. |
| 2009/0150735 | A1 | 6/2009 | Israel et al. |
| 2009/0172552 | A1 | 7/2009 | Segel et al. |
| 2010/0125604 | A1 | 5/2010 | Martinez et al. |
| 2010/0162286 | A1 | 6/2010 | Berry |
| 2010/0333125 | A1 | 12/2010 | Eldering et al. |

OTHER PUBLICATIONS

DreamGrow Social Media, "46 Free Social Media Monitoring Tools", last accessed Apr. 21, 2011, pp. 1-17, available at www.dreamgrow.com/46-free-social-media-monitoring-tools.

MediaUnbound, "Tier 2: Full Dynamic Personalization Platform", last accessed Oct. 14, 2011, pp. 1-2, available at: https://web.archive.org/web/20111014040014/http://www.mediaunbound.com/products?a=dynamic, pp. 1-2.

Viral Video Chart, "Top 20 Viral Videos", last accessed Apr. 21, 2011, pp. 1-4, available at http://viralvideochart.unrulymedia.com.

* cited by examiner

METHOD AND SYSTEM FOR FACILITATING DEMAND-DRIVEN DISTRIBUTION OF CONTENT

CROSS-REFERENCE TO RELATED APPLICATION

This application is a continuation of U.S. patent application Ser. No. 13/101,904, filed May 5, 2011, which is hereby incorporated by reference herein in its entirety.

TECHNICAL FIELD

The present invention relates to content distribution and, more particularly, to methods and systems for enabling or facilitating Video-On-Demand (VOD) accessing of content.

BACKGROUND

Recent market research (e.g., Nielsen three-screen report) indicates that users are consuming more content, not just on television but also online. The data also shows that a third of online content consumers hook up their personal computers (PCs) to their television sets (TVs) in order to watch that content. This underscores the fact that users want the convenience and diversity of online content—but with the lean-back, shared viewing experience of a big screen TV.

Notwithstanding this burgeoning demand for online content that is TV-accessible, the options available for users today in terms of bringing online (or internet or web) content to their TV typically involve the use of additional hardware and software bridges, e.g., HDMI adapters to connect PCs to TVs, or the purchase of additional 'set-top-box like' consoles such as AppleTV or Playstation3. Yet the implementation of such options can be costly. Further, such solutions also bring added complexity in terms of software configuration and setup, making them attractive mostly to early adopters or tech-savvy consumers.

The market research also indicates that X-shifting trends (i.e., consumers watching time-shifted, place-shifted or device-shifted content) are on the rise, driving the adoption of "Video-On-Demand" (VOD) solutions that cater to user convenience in content consumption. Because cable operators offer VOD features in their subscriber offerings, this is not only familiar to most consumers but gives them utility without the direct hardware costs and setup complexity.

Yet conventional VOD solutions are not appropriate for allowing consumers to meet their above-described desires for TV-accessible online (or internet/web) content, for several reasons. In particular, storage and processing resources available at VOD providers are necessarily finite and expensive, making it impractical for the operator to store every possible content item available online. Further, conventional VOD content tends to be carefully selected and otherwise processed so as to make the most desired content available to users and to make the best use of the aforementioned limited storage and processing resources available to VOD providers. For example, conventional VOD systems often employ catalogs that are determined in advance by content providers or operators and then "pitched" to head-ends. Although such conventional selection/processing is suitable for conventional VOD content, it is not suitable in relation to online content given the volume of content involved, the rapid evolution of and changes in such content, and rapid changes in user demand for various content. In particular, conventional VOD systems are often slow to respond to sudden changes in demand (peaks and valleys) as often can occur in relation to online content for any of a variety of reasons. As a result, conventional VOD systems may fail to contain or offer large amounts of content that are suddenly in-demand, or may reserve valuable storage and processing resources for content that is past its prime from a consumer demand perspective.

It would therefore be advantageous if an improved system or method could be developed that facilitated the delivery of TV-accessible online content to users and, in at least some embodiments, overcame one or more of the limitations associated with the provision of content by way of conventional VOD systems particularly so as to allow for both large volumes of online content to be made TV-accessible to users and/or also to enhance the degree to which the online content made TV-accessible is likely to be desired by users or otherwise is most suitable for being made TV-accessible.

SUMMARY

The present inventors have recognized the desire of consumers for TV-accessible online content and recognized the limitations of conventional VOD systems in addressing this demand. The present inventors further recognized that one or more such limitations can be overcome through the implementation of a system that, in at least some embodiments, is a content tracking and processing system operating in conjunction with a VOD system, where the content tracking and processing system uses dynamic demand data (e.g., real-time usage statistics and trend statistics from social networks, trend trackers, video sites, subscriber-specific demand criteria, etc.) for video-related attributes (content links as well as keywords/attributes such as cast) to establish the business rules for that content, and to update those rules (post-ingest) to reflect any divergence from predicted demand.

In at least some such embodiments, business rules are determined for new content ingested into the VOD system initially based upon certain information and then further modified based upon additional dynamic information. For example, content lifetime can initially be set based on predicted demand (given real-time demand and history), and content visibility can be set by the content provider policy (if there is a content provider, or if not, given reasonable defaults). Also for example, related criteria (e.g., metadata) that is missing or invalid in the content source can be sanitized or set to a reasonable default to ensure business rules are processed (fired) correctly. Note that all of these criteria can (and typically are) then dynamically updated if a trend is seen to have changed. Again for example, a content lifetime set based on dynamically-predicated demand can be extended if the demand for that content continues to be sustained or reduced if the monitored demand falls below earlier predictions.

In at least some further embodiments, the system additionally operates to normalize the metadata fields for online (e.g., internet or web) content so as to smooth out semantic discrepancies (e.g., if "title" is set to item name on one website and to item description on another website, this discrepancy is recognized and eliminated), syntactic problems (e.g., metadata containing special characters that are not accepted by the VOD system are sanitized) and omissions (e.g., content misses an "advisory" rating—in such case, such a rating can be inferred or a reasonable default such as "Unrated" can be added to the content to make it suitable for commercial grade storefront display). Such normalization or standardization also allows online (non-commercial) content to be ingested and processed exactly like commercial content, without requiring any substantial change to the ingest architecture or to the content discovery and purchase storefronts within the headends.

In at least some additional embodiments, the system additionally operates to support explicit demand via directed user requests for that content where the 'user' is a subscriber to that cable ecosystem (and is hence associated with a subscriber ID and billing account) and the request contains a user-defined expiry date to indicate the urgency of that request (i.e., that user's degree of interest) in that item. In this aspect, the focus can be to use the mechanism to elicit personalized interests data from the user and potentially create a slab-pricing model for ingesting Internet content for those subscribers based on existing demand (i.e., position of their requested item in the hot list). It also has the benefit of allowing feedback to the consumer to sustain his engagement e.g., by notifying him if/when the content is ingested—or if not, giving him the option to be notified if that content will be available on VOD or broadcast schedule in the future. In at least some further embodiments, a "hot feed" based on the hot list is pitched from the remote ingest service, which contains content that has already been curated to optimize the revenue (based on demand) while still adhering to the preferences (e.g., which types of content are of interest) specified by individual head-ends for localized ingest.

Although the above processes can be applied with respect to online (e.g., internet or web) content, in at least some embodiments these processes can also be performed in relation to commercial content as well. In at least one embodiment, the present invention further relates to a method of facilitating demand-driven population and management of online content within a video-on-demand (VOD) service. The method includes receiving trend information and an initial link reference at one or more first input ports, the initial link reference being at least indirectly indicative of a location at which the online content is available. The method additionally includes obtaining and normalizing, by way of one or more processing devices, metadata pertaining to the online content, and also determining business rule information pertaining to the online content based at least indirectly upon the trend information, content provider policy information, and the normalized metadata, by way of the one or more processing devices. The method further includes outputting via one or more output ports the business rule information for receipt by the VOD service, whereby availability and prioritization of the online content at the VOD service is based at least in part upon the output business rule information.

Further, in at least one additional embodiment, the present invention relates to a system for facilitating user consumption of online content at a user interface device by way of a video-on-demand (VOD) device. The system includes one or more input ports by which the system is configured to receive trend information and initial link information related to the online content. The system also includes one or more output ports by which the system is configured to provide processed information for receipt by the VOD system, and one or more memory devices. The system further includes one or more processing devices coupled at least indirectly to the one or more input ports, the one or more output ports, and the one or more memory devices, and configured to operate to provide a provider adapter portion and a business rule generator portion. The provider adapter portion is configured to perform first processing by which metadata information associated with the online content is normalized, and the business rule generator portion is configured to perform second processing by which one or more business rules associated with the online content are determined, the one or more business rules being determined at least in part based upon the trend information, whereby the processed information includes the normalized metadata information and the one or more business rules pertaining to the online content.

Additionally, in at least one further embodiment, the present invention relates to a method of facilitating user consumption of online content at a user interface device by way of a video-on-demand (VOD) device. The method includes receiving, at one or more input ports, a plurality of initial link references, trend information, and one or more express user requests, where the initial link references, trend information, and one or more express user requests pertain to a plurality of portions of online content available respectively at a plurality of locations at least indirectly specified by the respective initial link references. The method also includes obtaining metadata portions pertaining to the portions of online content and normalizing the obtained metadata portions by way of a plurality of modules respectively adapted to interact with a plurality of sources for the respective portions of online content, and determining a plurality of business rules pertaining to the portions of online content based at least indirectly upon the trend information and the normalized metadata, by way of one or more processing devices. The method further includes identifying a subset of the portions of online content with respect to which the express user requests or other indications of interest have been received at least indirectly from one or more users interacting at least indirectly with the VOD device. The method also includes sending, via one or more output ports and for receipt by the VOD device, output information regarding the subset of the portions of online content, wherein the output information includes link reference information including, for each of the portions of online content within the subset, either a respective one of the initial link references or a modified link reference indicating the location at which the respective portion is available, and further including one or more of the business rules pertaining to the subset of the portions of online content, whereby operation of the VOD device is based at least in part upon the output information.

DETAILED DESCRIPTION

Figure 1:
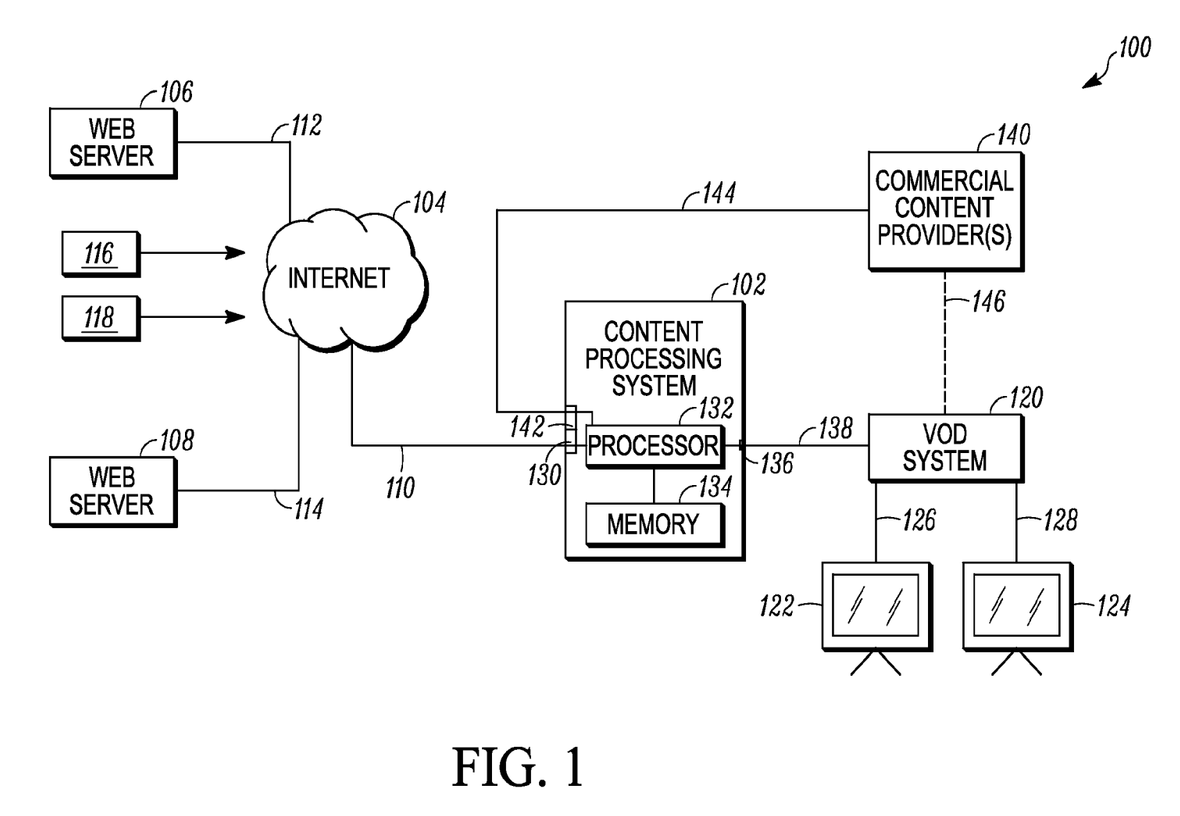
FIG. 1 is a schematic diagram showing an example content distribution system including an example content processing system that, among other things, facilitates the distribution of online content to a VOD system as shown.

Referring to FIG. 1, a block diagram of an example content distribution system 100 is shown in a simplified schematic form. As shown, the content distribution system 100 includes a content processing system 102 that is in communication with (or capable of communications with)

the internet 104, by which the content processing system 102 is further in communication with (or capable of communication with) first and second web servers 106 and 108, respectively. Communications between the content distribution system 100 and the internet 102 are represented by a communication link 110, while communications between the internet 102 and the first and second web servers 106, 108 are represented by additional communication links 112 and 114, respectively, which themselves can be (but need not be) considered to form part of the internet as well.

As will be discussed in further detail below, the content processing system 102 among other things is able to receive information relating to online content represented by rectangles 116 and 118 from the web servers 106 and 108, respectively, it being understood that this information is transmitted from the web servers via the communication links 112 and 114, respectively, and further via the internet 104 and the communication link 110, for receipt by the content processing system 102. The information can include actual online content (e.g., videos) as well as associated information such as metadata, as described in further detail below. The information arrives at the content processing system 102 via one or more input ports 130 by which the content processing system is in communication with the internet 104. Upon being received in this manner, a processor portion 132 of the content processing system 102 processes that information as described in more detail with respect to FIGS. 2-4. Some or all of the information, whether it be the online content itself or information relating thereto (e.g., metadata) is stored further in a memory portion 134 of the content processing system 102, which is in communication with the processing portion 132.

The processor portion 132 can take a variety of forms depending upon the embodiment (e.g., one or more of microprocessor(s), microcomputer(s), application-specific integrated circuit(s), etc.). Likewise, the memory portion 134 can depending upon the embodiment take a variety of forms (e.g., one or more read-only memory devices, one or more random access memory devices, one or more static random access memory devices, one or more dynamic random access memory devices, etc.). In at least some embodiments, the memory portion 134 (or a portion thereof) can be integrated with the processor portion 132 (or a portion thereof) in a single device (e.g., a processing device including memory or processor-in-memory (PIM)), albeit such a single device will still typically have distinct portions/sections that perform the different processing and memory functions and that can be considered separate devices.

Notwithstanding the above description relating to the first and second web servers 106, 108, it should be appreciated that, depending upon the embodiment, the content processing system 102 is capable of communicating, via the internet 104, with any arbitrary number of web servers or other devices capable of internet-based communications. Also, depending upon the embodiment or implementation, the online content can be pulled by the content processing system 102 by way of requests for online content sent by the content processing system to the web servers 106, 108, and/or pushed by the web servers 106, 108 for receipt by the content processing system 102 (e.g., where new online content is sent on a regular basis to the content processing system). For example, the first web server 106 can have a "push" relationship with the content processing system 102 while the second web server can have a "pull" relationship with the content processing system.

The online content can vary considerably upon the embodiment and, among other things, can contain video and audio data. In at least some embodiments, the web servers 106, 108 can be considered content provider website (CPWs), which can be understood to generally encompass any of a variety of types of websites including, for example, social networking websites (SNWs), business-to-business websites, business-to-consumer websites, news feeds, video broadcast or other broadcast sources, music and photograph websites, or other sources of media content. Further for example, such a CPW can include Facebook™, MySpace™, hi5™, LinkedIn™, and Twitter™, youtube.com, hulu.com, as well as sources of RSS or other news feeds, photograph services such as Picasa™ or Photobucket™, and music services such as LastFM™.

The internet 104 should be understood to include any number of internet, intranet, and/or World Wide Web communication pathways, which can employ numerous intermediary hardware and/or software devices including, for example, numerous routers, etc. Although the communication links 110, 112, 114 are shown in FIG. 1 as being components of the content distribution system 100 that are distinct from the internet 104, these communication links can also themselves be considered to constitute part of the internet 104 as broadly understood. It should be understood that the communication links 110, 112, 114 and internet 104 are intended to be representative of any of a variety of hardware communications mechanisms or devices employed for conducting internet-type communications, including any of a variety of wired and/or wireless communication devices or links such as cellular towers and access points, landline connections (e.g., fiber optic or copper wiring connections), microwave communications, radio channel communications, and/or wireless path communications. Also, any of a variety of software and/or communication protocols and methodologies can be used to conduct the communications over the internet 104 and the communication links 110, 112, 114 including, for example, the transmission control protocol/internet protocol (TCP/IP), extensible messaging and presence protocol (XMPP), file transfer protocol (FTP), etc.

Still referring to FIG. 1, the content processing system 102 is further shown to be in communication with a video-on-demand (VOD) system 120 that can be considered to be (or include) a "head-end" system in which content is stored. As will be described in further detail with respect to FIG. 2, online content and associated information (e.g., metadata) is output from the content processing system 102 (particularly from the processor portion 132) via one or more output ports 136, and is then further transmitted to the VOD system 120 by way of a communication link 138. The communication link 138 is intended to be representative of any of a variety of types of hardware communications mechanisms or devices, including any of a variety of wired and/or wireless communication devices or links, as well as any of a variety of software and/or communication protocols and methodologies. Although the communication link 138 in FIG. 1 is not shown as involving the internet 104, in other embodiments communications between the content processing system 102 and the VOD system 120 can be or involve internet-type communications.

The VOD system 120 can take a variety of forms and have a variety of different components depending upon the embodiment. As shown, the VOD system 120 is accessible by first and second content consumption devices ("CCDs") 122 and 124, respectively, by way of further communication links 126 and 128, respectively. As particularly illustrated in FIG. 1, the CCDs 122 and 124 can take the form of television sets (TVs) that can be operated by users to perform selection, downloading and viewing operations. In other embodiments, one or both of the CCDs 122 and 124 can instead include any of a number of other forms of devices. Typically, the CCDs are devices with relatively large viewing screens. For example, in some other embodiments, one or both of the CCDs 122, 124 can be computers with large monitors or displays that are in communication with the VOD system 120. Also for example, in some alternate embodiments, instead of or in addition to one or more TVs, the CCDs 122, 124 can include one or more gaming device(s), netbook(s), e-reader(s), e-book(s), tablet device(s), navigation device(s) with video capable screen(s), and/or other devices that can be in communication with the VOD system and employed by users for accessing content. Further, in some embodiments, the CCDs 122, 124 can be any devices, including mobile devices (e.g., tablets), by which cable providers provide direct streaming of broadcasted content (so as to make those devices TVs in their own right). Thus, in at least some embodiments, the CCDs 122, 124 are representative of any device that is covered by a cable operator and that has an application authorized by a multisystem (cable) operator (MSO) that supports VOD access. Finally, it should be appreciated that, although in the present embodiment, the two CCDs 122, 124 are shown as being in communication with the VOD system 120, in other embodiments only one CCD or any arbitrary number of CCDs other than two CCDs (of any of the above-described types) are in communication with the VOD system.

It should further be understood that each of the CCDs 122, 124 shown in FIG. 1 (or any other CCDs that can be present in other embodiments) can be operated by users to interact with the VOD system 120 in various manners, such that users are able to select particular content available at the VOD system 120, to download that selected content, and to consume (e.g., view) that selected, downloaded content on the CCDs. To allow for such operation, in at least some embodiments, the VOD system 120 includes one or more memory devices by which content is stored on the VOD system, as well as one or more processing devices that allow for the VOD system to interact with other devices such as the CCDs 122, 124 so as to allow for the selection and downloading of content to those devices. Further, in at least some embodiments, the CCDs can include cable boxes or devices akin to cable boxes by which users of the CCDs are able to interact with the VOD system 120.

So that users operating the CCDs 122, 124 (or other media consumption devices) can interact with the VOD system 120, the CCDs can also include processing and/or memory devices that at least allow for the CCDs to provide interfacing functionality by which the CCDs are capable of interaction with both users (e.g., to allow for user selection of different content) as well as with the VOD system. As discussed further below, in the present embodiment the content processing system 102 is capable of developing "hot lists" or priority lists of available and/or preferred content items that are accessible by users. Such list information can be communicated not only from the content processing system 102 to the VOD system 120 but also from the VOD system to the CCDs 122, 124, and upon reaching the CCDs this information can be accessed by users, who then are able to select content items from the listed items so that those content items are displayed (or otherwise provided for consumption by the users) by the CCDs. In particular, upon a user providing a selection to one of the CCDs 122, 124, a signal is provided from that CCD back to the VOD system 120 and, in response, the VOD system delivers the selected content to the CCD so that the content is displayed thereon (or otherwise provided for consumption by the user). In at least some further embodiments, users can also provide input signals to the CCDs indicative of user preferences and or user inquiries (searches) for particular content items.

In the present embodiment the VOD system 120 is physically located remotely from the CCDs 122, 124 (or other media consumption device(s)), albeit in some alternate embodiments the VOD system can be positioned proximate one or more of the CCDs (or other media consumption device(s)). For example, the CCDs 122, 124 can be located in users' homes while the VOD system 120 can be located at a facility of a third party cable system operator or the like. Also, in the present embodiment the VOD system 120 is located physically remotely (apart from) the content processing system 102. That said, in other embodiments, the content processing system 102 can be physically proximate to, or even adjacent to, or even formed in combination with, the VOD system 120. It should be understood that the internet 104 allows for communication between the content processing system 102 and the web servers 106, 108 (and other devices in communication with the internet 104) generally irrespective of the relative physical locations of these devices, and it commonly will be the case that the content processing system 102 is located physically remotely from the web servers 106, 108 (and other devices in communication with the internet 104).

It should be noted that the term "content processing system" is used herein for convenience herein but is not intended to be strictly understood to only encompass systems that process actual online or other content such as videos, etc. Rather, although in some embodiments of the content processing system, the system actually receives and processes online content or other content (e.g., commercial content as discussed below) available at sources such as the web servers 106, 108, in other embodiments of the content processing system, the system only receives and processes information relating to such online content, which can include (as described further below) various metadata, trend information, link reference information, etc. In that sense, the term "content processing system" is intended to broadly encompass a variety of types of systems that vary in their responsibilities from merely processing information relating to online or other content to actually (and/or in addition) processing the online or other content itself. In embodiments where the content processing system actually receives online or other content, the content processing system can forward that content (as processed) to the VOD system 120. Further, it is envisioned that in other embodiments where the content processing system only processes other information (e.g., metadata) related to online or other content, but not the content itself, then the content processing system can still cause or influence ingest of the online content or other content by the VOD system 120 by providing that other information to the VOD system, and then the VOD system can itself access the online content or other content of interest by way of the internet, etc.

Although as described herein the content processing system 102 operates in a manner that facilitates the processing and distribution and, ultimately, the consumption (at devices such as the CCDs 122, 124) of online content available at devices such as the web servers 106, 108, the content processing system 102 is not intended to be limited to the processing and handling of such online content. Rather, the content processing system 102 in the present embodiments is also in communication with one or more commercial content providers 140, with "commercial content providers" being understood as encompassing a wide variety of sources of content that has already been processed or formatted in a manner suitable for the VOD system 120 and that typically is paid for by users who would like to consume that content. As shown, the content processing system 102 particularly includes one or more input/output ports 142 that are linked to the processor portion 132 internally within the content processing system 102, and that further are in communication with the commercial content provider(s) 140 via one or more communication links 144. As described further below with respect to FIG. 2, by virtue of the communication links 144, commercial content and associated information can be received at the content processing system 102 from the one or more commercial content providers 140.

Upon being received at the content processing system 102, that commercial content and/or associated information can be processed by the processor portion 132 and/or stored in the memory portion 134. The manner of processing of such commercial content and/or associated can vary depending upon the embodiment. Although in some circumstances such processing is different than that performed in relation to the online content, in other circumstances the processing that is performed can be identical or substantially similar to that performed in relation to online content. The commercial content and associated information, upon being processed by the processor portion 132 (or potentially without any such processing), can be sent to the VOD system 120 again by way of the output port 136 and the communication link 138. In at least some circumstances, the processor portion 132 can also send signals to the one or more commercial content providers 140 via the one or more input/output ports 142 and the one or more communication links 144. Further, although in the present embodiment the one or more commercial content providers 140 are shown to be in communication with the content processing system 102, in other embodiments the commercial content providers are instead (or additionally) in communication directly with the VOD system 120, by way of one or more other communication links 146 (shown as a dashed line).

Figure 2:
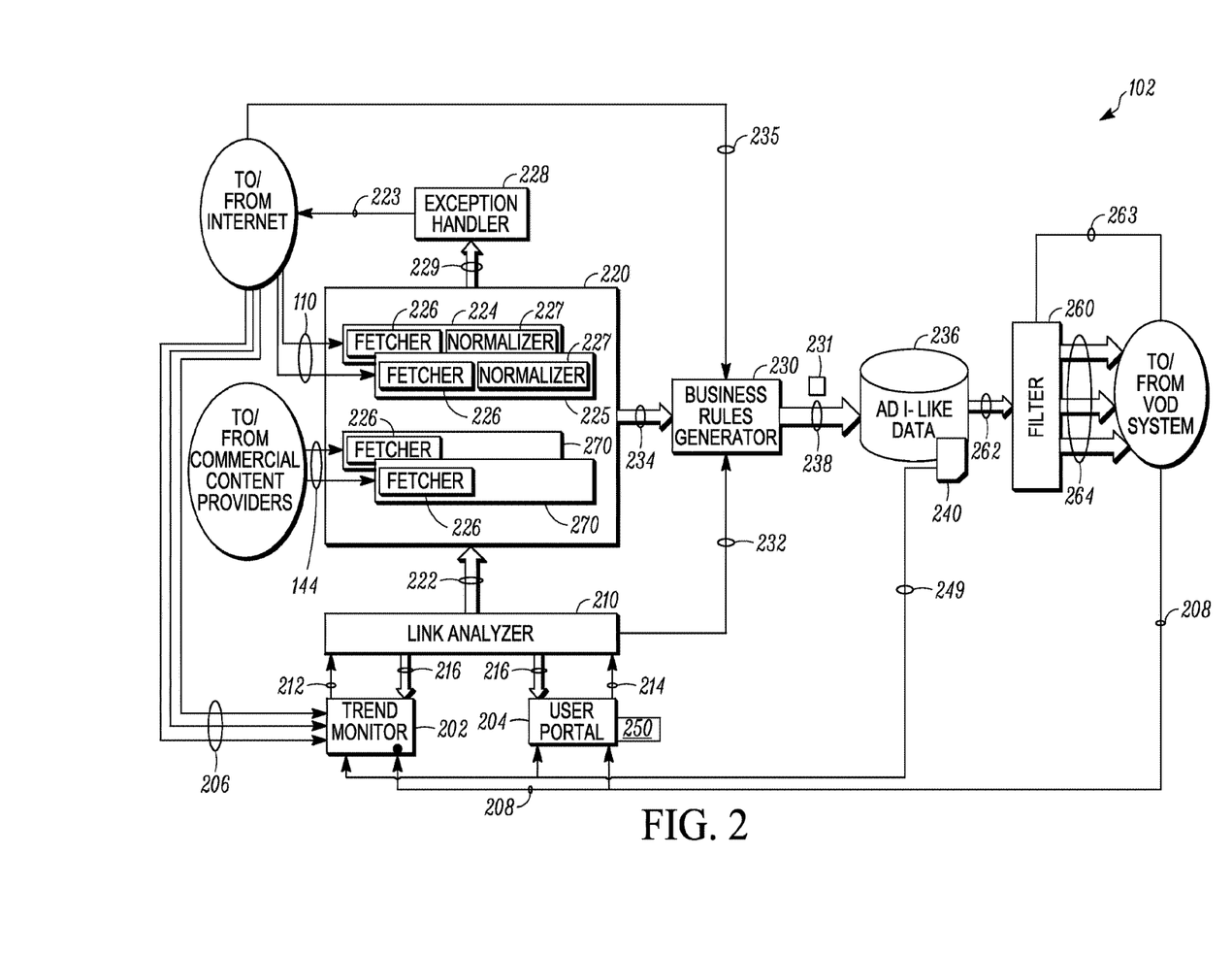
FIG. 2 is an additional schematic diagram showing in detail various operational subportions of the content processing system of FIG. 1.

Turning to FIG. 2, operational features of the content processing system 102 as it operates to process content and associated information, and to interact with other components of the content distribution system 100, are shown in more detail. The components shown in FIG. 2 particularly are intended to be representative of particular functional operations performed by the processor portion 132, albeit these operations in at least some circumstances also involve collaboration of the processor portion with one or more of the memory portion 134, the input port 130, the output port 136, and the input/output port 142 of the content processing system 102 as well. The functional operations, although represented by multiple distinct blocks, can all be performed by the processor portion 132 and need not each be performed by a separate respective hardware component. That said, it is also possible that each functional operation corresponding to a different respective block can be implemented on a respective portion of the hardware forming the processor portion 132, or even by way of a respective processor and/or related component(s).

It should further be appreciated that FIG. 2 shows a simplified version of the architecture of the content processing system 102 focusing particularly upon aspects that are of relevance to the content processing and distribution operations of the content processing system 102. That is, FIG. 2 shows particular operational characteristics of the content processing system 102 that are useful for providing a "remote ingest service" in which online content plus possibly commercial content as well is processed and handled in a manner that facilitates user accessing and consumption of that content via a VOD system. That said, it should be understood that some additional functional operations (and corresponding blocks) are omitted from FIG. 2 for clarity, even though such operations can be performed in various embodiments. Such additional functional operations (and corresponding blocks) can include, for example, those of an identity manager, and a publish/subscribe preferences manager.

In the present embodiment, the content processing system 102 particularly is configured to operate to determine the desirability of various online content available from internet-accessible devices such as the web servers 106, 108 and to make such online content available (e.g., prioritize such online content) for consumption by users based at least in part upon such determinations. The determinations as to priority of various online content in the present embodiment is determined based upon one or both of trend information from third party sources that is indicative of trends in the popularity of various online content, as well as explicit user requests for particular online content. In both of these cases, the particular online content made available for users is made available based upon assessments of demand, either that of the "market" for such information generally or that of a particular user (or users). For this reason, the operation of the content distribution system 100 and the content processing system 102 particularly can be considered to constitute a process for achieving demand-driven ingest of online content.

As shown in FIG. 2, in the present embodiment, the content processing system 102 particularly includes one or more trend monitors 202 and one or more user portals 204. The trend monitors 202 monitor implicit trend information, such as aggregate trends from social networks, real-time feeds or real-time usage statistics as can be provided from websites such as Twitter, and/or trend trackers (or trend tracking services), and/or other usage or trend statistics obtained from a variety of other sources (e.g., video sites). By comparison, the user portals 204 monitor explicit user requests for particular online content as received from the VOD system 120 (the user requests having been communicated to the VOD system from the CCDs 122, 124 being operated by the users). Trend information can be communicated to the trend monitors 202 from web servers such as the web servers 106, 108 or other CPWs via the internet 104 (and thus be received by the content processing system 102 at the input terminals 130), and the provision of such information to the trend monitors 202 is represented by arrows 206. The communication of information from the VOD system 120 (and from the CCDs via the VOD system) to the trend monitors 202 and/or to the user portals 204 is represented by arrows 208.

Still more particularly with respect to the implicit requests reflected by trend information, trend information particularly can contain trend statistics pertaining to given portions of online content (e.g., videos) available at given URLs (e.g., rates of references to a given video or keyword, absolute counts of references, historical predictions for that video/type etc.), alongside the URLs for that online content and related attributes (e.g., keywords, actors, etc.) provided by the trend source (which need not necessarily be the provider of the online content itself). Among other things, trend information can be obtained by the content processing system 102 operating as a subscriber to multiple feeds as well as a subscriber to various SNWs to monitor chatter related to various online content. The trend monitors 212 can cross-reference between such feed information identifying available online content and chatter/information pertaining to such online content, allowing the trend monitors 202 to deduce trends relating to the online content (e.g., deduce whether a given video is currently popular or "hot" or becoming so). In some cases, a dynamically-created "hot feed" can be generated in which candidate video references (or other online content references) come not from any single provider but from some trend-monitoring service, such as viral-video monitoring services (e.g., http://viral-videochart.unrulymedia.com/). Thus, real-time variations in demand for various online content items that can occur for a variety of reasons (e.g., based on real-time events related to that content including news stories, celebrity gossip or social recommendation) can be taken into account in making such online content available to users.

Further with respect to the explicit requests (from users) received at the user portals 204, such explicit requests can contain user ID information, the URLs of the online content, and deadlines (expiration times) by which the users wish to receive/consume that content, after which the users can be assumed to have lost interest in viewing or otherwise consuming that item (that is, after a given deadline for a given video has expired, it can be presumed that there is no longer demand for that video). To facilitate the receipt and tracking of such explicit requests from users, in at least some embodiments, each user portal includes an identity or subscriber manager module (not shown). Such an identity or subscriber manager module in particular can be used to authenticate one or more users and maintain respective personalized hot lists with respect to each such user (as discussed further below, such a personalized hotlist can include elements that reference related content in an aggregated hot list/ranked hot feed).

Further as shown in FIG. 2, the content processing system 102 also includes a link analyzer 210 that operates in communication with the trend monitors and user portals 204. Increasing usage of redirectors and URL shorteners implies that any given specified/requested URL (e.g., as extracted from a feed or news article) may not be the URL to the actual online content (e.g., video) of interest. Yet proper analysis of the demand for the online content associated with different URLs by which prioritization of different online content can be determined requires that the actual URLs for each portion of online content be properly identified. Consequently, in order to determine the demand for a given portion of online content (e.g., an actual video), the content processing system 102 in the present embodiment by way of the link analyzer 210 traces any pseudo-links concerning a given portion of online content back to the source URL for that online content. Hereinafter, such a source URL will be referred to as a "Link URL".

More particularly, the link analyzer 210 operation to the trend monitors 202 and user portals 204 as follows. Upon the trend monitors 202 and user portals 204 receiving information pertaining to various online content (as represented by the arrows 206, 208), the trend monitors and user portals pass along such information to the link analyzer. The communication of such information (e.g., URLs, trend statistics information, and relevant attributes of the video or other online content corresponding to the URLs) from the trend monitors 202 to the link analyzer 210 is represented by an arrow 212, while the communication of such information (e.g., requested URLs, user identification information, and/or deadline information) from the user portals 204 to the link analyzers 210 is represented by an arrow 214. Based upon this information, the link analyzer 210 determines the corresponding Link URLs and then passes those Link URLs back to the trend monitors 202 and user portals 204 (the "requesting entities") as represented by additional arrows 216. Upon receiving the Link URLs, the trend monitors 202 and user portals 204 are then able to maintain statistics in relation to the actual sources of the online content rather than in relation to pseudo-links, and therefore are able to track statistics accurately in relation to the properly-identified sources of the online content.

Additionally as shown, the content processing system 102 further includes a provider adapters unit 220 and a business rules generator 230, both of which are in communication with the link analyzer 210. More particularly as shown, the link analyzer 210 in addition to performing the aforementioned functions also passes on Link URLs (original online content source information as well as related attributes) to the provider adapters unit 220 as represented by an arrow 222. In response to receiving a given Link URL, the provider adapters unit 220 checks to see if that Link URL has been processed before. If the Link URL has not ever been processed before, then the provider adapters unit 220 retrieves the metadata for that Link URL, normalizes that metadata, and then stores the normalized metadata form against (in relation to) that Link URL (e.g., within the memory portion 134). It can further be noted that, in circumstances where statistics are shared for keywords instead of at a link (e.g., video link) reference layer, this process is still performed, but the statistics will now be used to update both keyword and link level counts as useful.

In addition to performing the above operations in relation to Link URL information provided to it, the provider adapters unit 220 particularly includes one or more provider adapter modules that respectively exist for interaction with each respective independent online content provider. In the present example embodiment, given that the first and second web servers 106, 108 are shown in FIG. 1 as being online content providers, first and second provider adapter modules 224 and 225 are shown, respectively. The respective first and second provider adapter modules 224, 225 respectively interact with the first and second web servers 106, 108 via respective internet (online) content feeds (shown as ICP1 and ICP2) established via the internet 104 and communication links 110, 112, 114, such that online content and associated information provided from the respective web servers is received at the provider adapter modules via the input port 130. Although only the two provider adapter modules 224, 225 are shown in FIG. 2, it should be appreciated that the number of provider adapter modules will vary depending upon the embodiment and typically will vary over time (e.g., as the online content providers change over time). In at least some embodiments, there is provided one provider adapter module per provider feed.

More particularly with respect to the provider adapter modules 224, 225 receiving online content, each of these modules is particularly responsible for operating as a respective fetcher 226 and operating as a respective normalizer 227. When a given one of the provider adapter modules 224, 225 operates in its capacity as the fetcher 226, such operation involves understanding how to interface to that module's respective one of the content providers (that is, the first web server 106 or second web server 108, as applicable) and extracting the content metadata from its respective feed (or feeds). By comparison, when a given one of the provider adapter modules 224, 225 operates in its capacity as a normalizer 227, such operation involves (upon receipt and extraction of the content metadata) mapping of that content metadata onto a normalized metadata format using provider-specific knowledge about semantic matching.

In this context, the provider adapter modules 224, 225 not only sanitize incorrectly formatted or illegally-characterized strings but also fill in suitable defaults for any metadata elements that are expected by VOD architectures (e.g., the expectations of the VOD system 120) but not present in all internet content by default (e.g., advisories). If the normalizer 227 of one of the provider adapter modules 224, 225 finds a certain item is impossible to correct, it can trigger the sending of a signal to an exception handler 228, as represented by an arrow 229, which in turn can send a further signal 223 to the provider (again, one of the web servers 106, 108) requesting correction—in most cases, the simplest choice may be to drop that item from consideration. Additionally, it should be noted that the content metadata that is extracted and normalized can particularly relate to provider policies relating to use of the online content to be provided from those providers. Often, such provider policies relate to static policies (e.g., the web server 106 can specify that clients are allowed to 'store' the online content provided from that web server for redistribution for a maximum of 2 days) and not dynamic demand.

In addition to passing the Link URLs to the provider adapters unit 220, the link analyzer 210 further passes the Link URLs as well as statistics corresponding to those Link URLs to a business rules generator 230 as represented by an arrow 232. By virtue of the communication of this information, the business rules generator 230 particularly is apprised also of the existence of either an explicit or implicit request (based upon a command received at the user portals 204 or based upon statistics information received at the trend monitors 202). Further, the normalized metadata generated by the normalizers 227 of the provider adapter modules 224, 225 also is sent, along with the Link URLs to which that normalized metadata corresponds, to the business rules generator 230 as represented by an arrow 234. Additionally, either as part of the normalized metadata or separately (as represented by an arrow 235), the business rules generator 230 can also receive information regarding any respective provider policies associated with the respective providers (e.g., the web servers 106, 108) at the Link URLs from which respective portions of online content (e.g., the online content 116, 118) are received. As discussed further below, such provider policies can specify one or more obligations or constraints associated with the accessing of the online content at those providers.

In response to receiving the information as represented by the arrows 232 and 234 (and possibly the arrow 235 as well), the business rules generator 230 considers both the dynamic demand statistics provided along with the request as indicated by the information received from the link analyzer 210 as well as any information regarding provider-specific policies or normalized metadata that is provided to it by provider adapter modules 224, 225 of the provider adapters unit 220. Based upon its consideration of this information, the business rules generator 230 in turn formulates (generates) business rules 231 pertaining to the online content associated with the Link URLs. As discussed further below, the business rules 231 are ultimately forwarded to the VOD system 120 for use by the VOD system in terms of making particular online content available to the various users of the CCDS 122, 124 with which the VOD system is in communication.

Depending upon the embodiment, the business rules 231 can take various forms. In the present embodiment, the business rules 231 include lifetime rules specifying a respective lifetime or "shelf life" that should be ascribed to each respective portion of online content in terms of how long that online content should remain available (or remain as suggested online content) to users via the VOD system 120. Additionally, in the present embodiment, the business rules also include visibility rules specifying restrictions in terms of which users should be allowed to view which respective portions of the online content. For example, some online content should not be made accessible to some users if the online content is not suitable (e.g., because of its violent nature or the language used in the online content). In at least some embodiments, the business rules 231 are incorporated with the online content itself (e.g., as metadata associated with that online content), in which case the business rules 231 shown in FIG. 2 can be understood to include both the online content associated with various Link URLs plus business rules and other metadata associated therewith.

Although it is possible for the business rules generator 230 to formulate business rule(s) in some circumstances based merely upon the information received from the link analyzer 210 as represented by the arrow 232 or alternatively merely upon the information received from the provider adapters unit 220 as represented by the arrow 234, often a combination of both the information from the link analyzer and the information from the provider adapters unit is useful (or even necessary) for establishing particular business rules, particularly final business rules that are suitable for governing the treatment of particular online content for a given lifetime. Also, in some embodiments or circumstances, one or more of the business rules 231 previously developed by the business rules generator 230 in relation to one or more portions of the online content 116, 118 (for example, previously-ingested non-commercial content) can be and/or need to be updated or modified (or otherwise adapted, for example, by creating new business rule(s)) by the business rules generator. Such updates or modifications can be made (and potentially can need to be made) as trend information received by the trend monitors 202 changes over time (for example, as additional or supplemental trend information is received regarding previously-ingested content), as new requests are received via the user portals 204, and/or as the portions of online content or information associated therewith (e.g., metadata associated with the online content) change over time.

Numerous manners of exemplary operation of the business rules generator 230 are possible. For example, suppose a demand is received at one of the user portals 204 indicating a need to store the online content 116 in the VOD system 120 for 4 days, but the provider of that online content (the web server 106) has a policy allowing for that online content to be accessible for only 2 days. In such case, the business rules generator 230 can determine a lifetime rule associated with that online content specifying a lifetime of 2 days (to honor the provider's policy) but schedule an alert to revisit the ID and re-ingest or refresh the expiry date by another 2-day period after the expiration of the first 2-day period until demand expires. Alternatively, suppose a demand is received at one of the user portals 204 indicating that the online content 116 needs to be available (stored on the VOD system 120) for merely 24 hours, and that the web server 106 that is the provider of that online content still has the aforementioned 2-day rule. In such case, the business rules generator 230 will set the VOD system 120 expiration to 24 hours even though, in view of the provider's policy, that online content could actually be stored for another 24 hours without any violation of the policy.

Additionally as shown in FIG. 2, the business rules 231 when newly formulated and/or updated by the business rules generator 230 are sent to an Asset Distribution Interface (ADI) storage unit or database 236 as represented by an arrow 238. The ADI storage unit 236 is configured to handle information in accordance with any one or more of several ADI metadata specifications that are available including, for example, as described in "Metadata Specifications ADI 2.0 Specification Asset Inventory Messages MD-SP-ADI2.0-AIM-I02-060505" dated May 5, 2006 made available from Cable Television Laboratories, Inc. of Louisville, Colo., which is hereby incorporated by reference herein. Even though the present embodiment is shown to employ the ADI storage unit, in other embodiments any of a variety of other storage units or databases handling information (and particularly metadata) in other manners can be employed. That is, in other embodiments, the storage unit or database need not be an ADI storage unit or database as shown, but can take other forms.

That said, again as mentioned below, the business rules 231 can be considered to include (at least in some circumstances) the normalized metadata associated with the online content at the Link URLs to which the business rules apply, as well as the online content (and Link URLs) itself. Thus, once a business rule is generated or an update to a business rule is completed, that business rule (or updated business rule) is provided, along with the normalized metadata associated with the online content to which that business rule pertains and the Link URLs corresponding to that online content (and, in some embodiments, even possibly the online content itself), in an ADI-format or ADI-like format, to the ADI storage unit 236 and stored in that unit, where it can then be accessed or published in any required representation including ADI or basic XML/JSON.

Additionally at the ADI storage unit 236, demand metrics are also used to determine a ranking/priority for each online content item that is referenced by the business rules 231 provided to the ADI storage unit. Based upon such rankings/priority determinations for multiple online content items, an aggregate priority list or aggregate hot list 240 is compiled from the ADI storage unit 236. Although the aggregate hot list 240 can take a variety of forms depending upon the embodiment, referring additionally to FIG. 3, in the present embodiment the aggregate hot list can take the form of a table having first, second, and third columns 242, 244 and 245, respectively, in which are respectively listed hot list identification codes, corresponding link URLs, and status information regarding each portion of online content that has been demanded/requested either expressly (via a request provided to the user portals 204) or implicitly (via trend information received by the trend monitors 202). The listed online content items in the hot list 240 in the present embodiment particularly are grouped into top and bottom regions 246 and 248, respectively, based upon whether the online content has a pending status or has been ingested by a certain time/date. In each of these regions, the online content items are particularly listed in the order of priority as determined by the ADI storage unit 236 (e.g., higher priority to lower priority ordered from top to bottom within either of the regions 246 or 248).

Still referring to FIG. 2, as represented by an arrow 249, some or all of the information within the aggregate hot list 240, and particularly the database identities/hot list identification information of stored items of online content, are propagated back to the original requestors of such portions of online content, namely, the trend monitors 202 and user portals 204, enabling them to now track the rank or ingest-status of each requested portion of online content. The trend monitors 202 use this information to monitor the ingest status of each item of online content that was implicitly requested so that, if ingested, the trend monitors can further track the demand for an item with an even finer granularity than would otherwise be possible, so as to be more responsive to updates that can lengthen or diminish the lifetime(s) of particular items of online content ultimately made available by the VOD system 120 in accordance with the business rules 231.

As for the use of the aggregate hot list information by the user portals 204, the user portals in particular use this information to create one or more personal priority lists or personal hot lists 250 showing the relative priority of various user requests associated with each respective user who has made request(s) (or user interface devices at which request(s) have been made) for respective online content. As shown also in FIG. 3, each personal hot list 250 has first, second, and third columns 252, 254, and 255, respectively, in which are listed hot list identification information, Link URLs, and price information for each requested portion of online content. As with the aggregate hot list 240, the information in each personal hot list 250 can also be grouped into regions/rows 256 based upon the price information in the third column 255 (thus, the example shown, there are several such regions/rows shown corresponding to pricing that is free, or at a slab 1, or at a slab 2, etc.).

Figure 3:
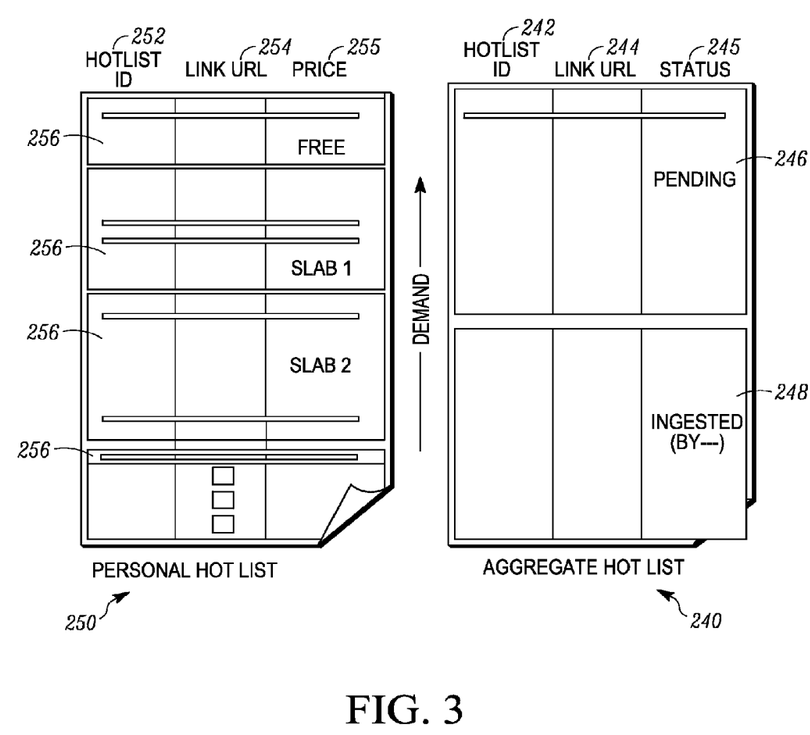
FIG. 3 is a schematic diagram illustrating features of an example aggregate hot list and example personal hot list as are employed by the content processing system of FIG. 2.

More particularly in this regard, in at least some embodiments it is possible to implement demand-based pricing where the personal hot list 250 can be broken down by operators into "slab" rates (associated with the different regions/rows 256). Content in the topmost slab can be free to subscribers since demand indicates that it will be watched by sufficient users and can thus be monetized (or subsidized) by other means like ads. Content in lower slabs can be priced in tiered fashion to balance smaller demand with costs for VOD system maintenance around that item. Furthermore, when the request is initiated by a user/subscriber (indicating a higher degree of interest, that is, pull vs. push) then new pricing models can be utilized that take into account that subscriber's stated deadline as another criteria to be used in presenting a more personalized slab pricing scheme via the personal hot list associated with that user at the user portal. Users can be "persuaded" to then take additional steps to get the content at a price that they are willing to pay. For example, users can enlist friends to all request the same online content item in order to push it up the hot list into a slab that is more conducive to their respective wallets, or the users can extend the deadline by which the users are willing to view the content giving a broader window of opportunity to gather demand around that item.

Still referring to FIG. 2, the aggregate hot list 240 determined at the ADI storage unit 236 is in the present embodiment essentially an aggregate list of all received requests ranked in order of current demand. In many operational circumstances, the aggregate hot list 240 is or becomes too large to be completely ingested by VOD systems such as the VOD system 120. Further, not every VOD system/head end is interested in all content that is viral for a variety of reasons including, for example, because some local viral content may be a niche market. This being the case, the content processing system 102 further includes a filter (or possibly multiple filters) 260 that is designed to allow VOD services (in headends) such as the VOD system 120 to register their interest in some subset of the aggregate hot list 240 based on either ranking or content attributes, thereby allowing them to receive a subset of online content items that are known to be in demand (based upon the information received at the user portals 202 and trend monitors 204) and also are relevant to the particular targeted subscriber market of the particular VOD system (such as the VOD system 120).

More particularly, as shown in FIG. 2, information regarding the aggregate hot list 240 and the business rules 231 (including any Link URL, normalized metadata, and other information associated therewith, including possibly in some embodiments the online content of interest itself) is provided from the ADI storage unit 236 to the filter 260 as represented by an arrow 262. The filter 260 additionally is configured to receive, from the VOD system 120, information regarding headend/VOD subscription interests, as represented by an arrow 263. This information in at least some embodiments is representative of particular preferences of particular users/subscribers who are interacting or registered with the VOD system 120. Based upon this information, the filter 260 determines which online content available to it and referenced by the aggregate hot list 240 is particularly appropriate for the VOD system 120 (and/or the users interacting or registered with the VOD system).

In response to receiving this information, as represented by arrows 264 the filter 260 in turn outputs (pitches) related metadata (ADI) packages to the related ingest components within the VOD system 120 (headend), which is then responsible for actually populating the VOD system. The information that is transmitted in this regard particularly includes the business rules 231 (including new or updated business rules that constitute adaptations of prior business rules based in part upon newly-received trend information or other information), normalized metadata, and Link URL information pertinent to the online content determined to suitable for the VOD system 102, and also can be further supplemented by relevant portion(s) of the aggregate hot list 240 (or even portions of the online content itself). In this manner, the VOD system 120 is populated with information regarding online content that has been requested or demanded (either expressly by a user associated with one of the CCDs 122, 124 as communicated to the user portals 204, or implicitly based upon trend information received at the trend monitors 202), and that is suitable for the VOD system (and/or its particular users/subscribers) based upon the preferences of the users/subscribers. Upon such information being provided, the VOD system 120 is thus able to make available such online content to users at the CCDs 122, 124.

As already discussed, the interaction between the VOD system 120 and the content processing system 102 involves not only the transmission of information relating to online content items from the content processing system to the VOD system 120 (as represented by the arrows 264) but also the communication of information from the VOD system to the content processing system. Such communication of information from the VOD system 120 to the content processing system 102 particularly includes not only the information regarding headend/VOD subscription interests (as represented by the arrow 263), but also the information represented by the arrow 208. In this regard, the information represented by the arrow 208 should be understood not only as encompassing user requests/demands for particular online content but also, when content is ingested at the VOD system 120, status updates that are provided back to the requestor(s) (to the user portals 204 and trend monitors 202). Based upon this information, the trend monitors 202 are able to track ingested items with finer granularity. Also, the user portal 204 can use this information to notify the user of the availability of particular online content that the user requested if the VOD system (headend) is associated with this user's subscriber region.

Although the above discussion is focused upon components of the content processing system 102 that handle online content, the same architecture can be used also to handle commercial content, and more particularly can be used to track dynamic demand for commercial assets and use these to surface legacy items that are not scheduled for VOD, but that may take advantage of transient windows of opportunity caused by spiking interest around the item or related attributes. For example, gossip around an actor may increase his/her profile for a few days such that users may have increased interest in revisiting older content featuring that actor. In such cases, the content processing system 102 can operate as discussed above except insofar as one or more provider adapter modules (or commercial provider portals) 270 lacking any normalizer (but rather only including respective fetchers 226) are employed in the provider adapters module 220. That is, in such circumstances, because the commercial content is already formatted in a clean, usable manner, normalization is not required.

That said, even in the case of commercial content, handling of the content can benefit from the dynamic business rule enforcement that can result either in the item being ingested (if not existent) or being extended (if existent) to meet demand. In some cases, the demand metrics can indicate that an existing item (pushed by a provider, such as one of the web servers 106, 108) has a lifetime larger than required by current demand. In some such cases, the exception handler 228 can be used also as a feedback mechanism to notify the provider of the conflict. Alternatively, in some such cases, the exception handler 228 (or provider adapters module 220) can correct this automatically based on provider-specified preferences for such cases.

Finally, it should also be noted that demand-driven ingest further has potential usefulness in relation to non-VOD content. For instance, if trending keywords or links reference content that has already been scheduled for a live broadcast (e.g., syndicated series or movie channel item) then this can help surface that content to users/subscribers in meaningful ways. For example, such information can be used as the basis for a mechanism allowing users to view hot list items on the current week's schedule and to set a record-request (or a reminder-to-watch request) for them with this context annotated. Or, where an explicit request for particular content has been made, the user can be notified that the content item is already scheduled for live broadcast and be routed to the above options (or possibly to a TV on demand (TVOD) item related to that request). It is further envisioned that the status feedback to the trend monitor can be useful to other cable/TV or subscriber services that also use the same trend monitoring service. Thus, if the trend monitor 202 is notified of the successful ingest of a content item seen on Twitter, it can then auto-annotate a "Watch on-demand" action against that link if/when it shows up on a user-facing application or stream (e.g., on a TV widget).

Figure 4:
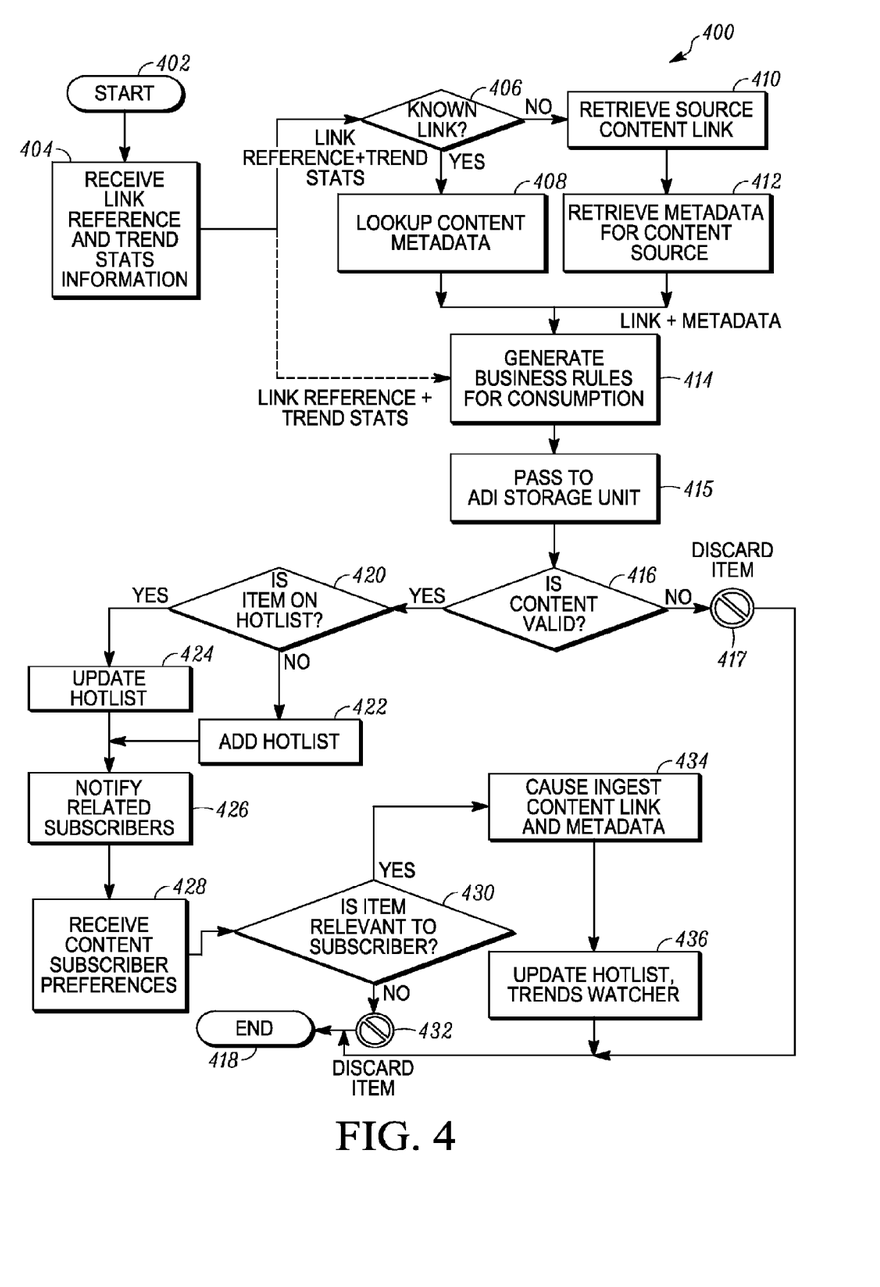
FIG. 4 is a flow chart showing example steps of operation of the content processing system of FIG. 2.

Turning to FIG. 4, a flow chart 400 shows example steps of operation of the content distribution system 100 and particularly operational steps of the content processing system 102 in obtaining, processing, and delivering online content to the VOD system 120, thereby facilitating user accessing and consumption of the online content. As shown, in the example process represented by the flow chart 400, after starting at a start step 402, the process advances to a step 404 at which the content processing system 102 receives link reference (URL) and trend statistics information. This operation performed at the step 404 corresponds to the discussion above regarding the operation of the trend monitors 202, by which the content processing system 102 receives trend information regarding candidates for demand-driven ingest of online content at link references. As already discussed, the trend monitor 202 among other things can receive social network information, trend tracking information and real-time usage statistic information.

Upon the receipt of the link reference (URL) and trend statistics information, this information (or information generated based thereon) is provided to the link analyzer 210, which at a step 406 determines whether the link references/URLs are known already by the link analyzer. As already discussed, it is important that the link references/URLs be analyzed in this manner because, in at least some circumstances, the URL information originally received is merely a shortened URL or redirection link that really refers to another URL or link at which the available or potentially desirable online content is actually located. If the link reference is determined by the link analyzer 210 at the step 406 to be already known (e.g., such that the link reference actually provides the location at which the desired online content is available, and thus constitutes a Link URL as referred to above), then the process advances to a step 408, at which the provider adapters unit 220 looks up (fetches and, if appropriate, normalizes) the associated content metadata. Such operation can particularly be performed by one of the provider adapter modules 224, 225 of the provider adapters unit 220.

If, however, it is determined by the link analyzer 210 at the step 406 that the link reference/URL is not a known link, then the link analyzer 210 operates to retrieve the source content link at step 410. Then, subsequently at a step 412, metadata for the content source is again retrieved by the provider adapters unit 220. Again, the obtaining of the metadata involves both operation of both the fetcher 226 and normalizer 227 of an appropriate one of the provider adapter modules 224, 225 of the provider adapters unit 220.

Regardless of whether the content metadata is looked up at the step 408 or the metadata is retrieved at the step 412, following each of these steps the process next advances to a step 414 at which the business rules generator 230 operates to generate business rules for consumption. As shown, for the purpose of generating these business rules, the business rules generator 230 not only receives the link and normalized metadata from the provider adapters unit 220 (following the steps 408 or 412), but also it receives the link reference (that is, the Link URL) and trend statistics provided from the link analyzer 210. Next, at a step 415, the business rules 231 generated at the step 414 (along with the normalized metadata, the relevant Link URL and possibly the actual online content of interest at that Link URL as well) is provided to the ADI storage unit 236.

Subsequently, at a step 416, the ADI storage unit 236 determines whether the content is valid. If the content is determined not to be valid at the step 416, then the item is discarded at a step 417, after which the process ends at an end step 418. If, however, the content is determined to be valid at the step 416, then the process advances to a step 420, at which the ADI storage unit 236 determines whether the online content item is on the aggregate hot list 240. If the online content item is not on the aggregate hot list 240, then the process proceeds to a step 422, at which a reference to the new online content item is added to that hot list. Alternatively, if the online content item is already on the aggregate hot list 240 as determined at the step 420, then the process advances instead to a step 424 at which the aggregate hot list is updated to include any additional information (e.g., new trend statistics or new business rules) related to that item.

Regardless of whether the aggregate hot list 240 is added to or updated at the steps 422 and 424, respectively, the process in either case still proceeds subsequently to a step 426, at which the content processing unit 102 sends a message to notify related subscribers (users) of the availability of new or updated online content items. Subsequently then at the step 428, the content subscriber preferences are received at the content processing system 102, as represented by the arrow 263 of FIG. 2. Then, at a step 430, the filter 260 makes a determination as to whether the new or updated online content item is relevant to the particular subscriber/user as indicated by the subscriber preferences. If at the step 430 it is determined that the online content is not relevant to the subscriber/user, then the process proceeds to a step 432 at which the online content item is again discarded and then the process ends at the end step 418. However, if the online content item is determined to be relevant to the subscriber/user at the step 430, then instead the process advances to a step 434 at which the content processing unit 102 causing the ingesting of the online content Link URL and associated normalized metadata and any relevant business rules 231. That is, this information is sent by the content processing unit 102 for receipt by the VOD system 120. As or after this occurs, at a step 436 the aggregate hot list 240 and any relevant trend information being monitored by the trend monitor 202 are updated, after which the process again ends at the step 418.

Although the process of the flow chart 400 particularly relates to embodiments or circumstances in which the operation of the content processing system 102 relates to the distribution of online content alone and does not include commercial content, it should be appreciated based upon the earlier discussion above that many of the operations shown in the flow chart 400 will still be performed even when the content of interest is commercial content. However, typically when the content of interest is commercial content, normalization will not need to be performed in relation the metadata associated with that content. Further, although the process of the flow chart 400 does not involve the receipt of express demands for particular content items that are provided to the user portals 204, it should be appreciated based upon the above discussion that the process can be modified to further encompass these operations, as well as operations related to the maintaining of personal hot lists 250.

In view of the above, it should be appreciated that, in at least some embodiments, the content processing system includes a trend monitoring service that monitors real-time feeds (social networks, news) to identify content URLs and relevant content keywords (e.g., actor names, movie titles) and publishes them to a hot feed service. Additionally, the content processing system includes service adapters for relevant content sites (in the provider adapters unit) that are triggered by the occurrence of their respective URLs in pushed trends. These pull in the current metadata for that service and "normalize" it to create a VOD compliant and consistent representation. Normalizing involves creating consistent semantics across provider-specific elements, and ensuring that required elements are present OR provided with suitable defaults as necessary.

Further, the content processing system in at least some embodiments includes a business adapter (the business rules generator) that uses the trend statistics and provider policies in combination to automatically define business rules for the online content (e.g., its lifetime and visibility). If a given link was already ingested, then the role of the business adapter is to propose and trigger an update to the business rules pertaining to that link, for example, an update extending the lifetime of an already-ingested asset so as to cope with continuing demand for that content. Also, the content processing system includes a recommender service which then ranks the trending content feed in the hot list. This service can be customized by the VOD architecture (by setting preferences or rules) to then recommend or pitch only the subset of this content that meets the current VOD needs. For instance, the VOD system can set a filter of the content processing system to ask for only the top 10 items from the hot feed, or for only hot items with specific keywords or providers, or can opt for real-time ingest of all hot feed content.

Additionally, in at least some embodiments, the trending service continues to monitor links that are in the hot list, automatically updating the business adapters (business rules generator) with changes in trends (up or down) directly. This can include, for example, identifying unanticipated drops in demand and correcting previously established rules accordingly. Also, in at least some embodiments, the service adapters (provider adapters unit) include commercial content provider adapters. In at least some such embodiments (and by comparison with the internet content adapters that fetch and normalize metadata associated with online content), the commercial content provider adapters operate to correlate trending "keywords" pushed by the trending service relative to provider back-catalogs to identify relevant content that can be surfaced against this demand. Based upon this operation, commercial content asset can then be pitched into the VOD system with dynamically-defined business rules regarding its visibility and lifetime. The ingest of such commercial content can take either of two forms, namely, actually ingesting of content with those business rules if that content (and business rules) are not already at the VOD system, or updating business rules for that content if it already exists in VOD system but is set to expire before predicted end of demand.

In still further embodiments, a user-interface (the user portals) is provided by which subscribers/users of the VOD system can submit direct requests for a content item (potentially either an online content item or a commercial content item) by providing identification, URL, and expiration information. (In at least some such embodiments the content processing system can automatically proceed with the ingest process where the expiration information indicates the date at which the user wants the request to expire because the user will no longer be interested in content at that time.) Further, in at least some such embodiments, the user is able to obtain a personalized view of the hot list showing where the user's request currently ranks in the priority for ingest. Thus the first user to submit a link may see that as a lowest-priority item for the hot feed; however, if the user generates demand for the content (e.g., via his or her social interactions that may encourage others to demand the same content) or if trends show growing demand for the content, then the content will move up the list and be ingested at some point by the VOD system.

Additionally in this regard, it can be noted that, because the user is identified with the link, he or she can be notified directly when that content is available for consumption on the VOD system (or if that content item is actually available on the week's scheduled programming for his or her current cable subscription). Second, in at least some embodiments it is possible to create a pricing-slab scheme for the hot list where, because the subscriber identity is known, the operator can create a slab rate around the hot list where items in the top slab ("hot" items) are free to ingest, but items that fall under this slab (e.g., content items that have different rates of perceived demand) are priced according to the anticipated demand such that users can get that item sooner if they are willing to pay a premium for it. The pricing can be driven by localized demand or request expiry date.

From the above description, it should be appreciated that the above-described content processing system is distinctive in its operation in that it employs dynamic demand information for online content items (and potentially other content as well) in setting business rules for the visibility and expiration of those online content items within the VOD system 102 and as presented to CCDs such as TVs or other media consumption devices by the VOD system 102. Thus, information regarding various (and fluctuating) consumer demand for online content is used as a significant basis for automatically determining business rules and making online content available accessible and determining the priority of such accessible online content at least partly in accordance with those business rules. Further, the content processing system is also distinctive in that it performs normalization of metadata associated with online content, by which all context information used to drive (or satisfy) business rules are available in a consistent format (despite diversity of formats, semantic mismatches, and omission errors found at many internet content portals). In at least some circumstances, the content processing system online content information can be filtered, searched or recommended using exactly the same metadata semantics used for standard commercial content.

Aspects of the content processing system in its various embodiments as described above are advantageous in numerous regards. In particular, features of the content processing system as described above make possible and practical the ingest of online (internet) content that would otherwise be very difficult to ingest due to the enormous volume of online content and metadata diversity associated with such content. Indeed, by turning usage to demand, it is possible to achieve low-cost operation for any of a variety of VOD architectures. Further, normalization processing particularly allows the content processing system to operate without reliance upon any assumed third party processing or externally-imposed standard.

Additionally, from the above description, it should additionally be appreciated that in at least some embodiments the content processing achieves enhanced benefits in terms of also (or instead) considering explicit, user-defined, demand requests (e.g., as received by the user portals 204). Also, in at least some additional embodiments, such demand information (whether implicit or explicit) can further be employed to develop pricing slab models, such as discussed with respect to the personal hot list 250. This can be captured simply by the visualization of a personal hot-list for each subscriber/user giving each such subscriber/user real-time feedback on pricing models for different content requests that adapt with real-time demand and consumer flexibility in fulfillment deadlines. Indeed, in at least some embodiments, there arises an ability to drive new demand-based pricing models around VOD content where subscribers can essentially pay premium prices for low-demand content, or potentially try to drive up demand for content amongst social networks in order to reduce effective costs.

Further, in at least some other embodiments, the content processing system is able to set the lifetimes/expiration dates of particular online content items based upon the demand-driven utility lifetime of those items, in a manner independent of (or largely independent of) any lifetimes ascribed to those items by the providers of those items. Also, in at least some embodiments, use of demand-driven ingest results in an ability to increase awareness of older (hidden) catalog assets in the context of transient events that create viral interest around metadata attributes (e.g., actor) related to that content—thereby increasing streams of revenue to operators.

Also, in at least some embodiments, benefits can be achieved by implementing some or all of the aforementioned features in a content distribution system that also distributes commercial content. In this regard, a demand-driven ingest solution particularly can increase revenue by surfacing commercial content in the right context (based on spikes in demand that can occur for a variety of reasons including, for example, due to unexpected events such as celebrity deaths, awards or gossip, related news stories, social recommendations, etc.) and reduce the overheads on the content providers themselves in having to manually curate and update their business rules for content that had either not been pitched, or that had been pitched but not configured to meet the appropriate lifetime or visibility criteria the event demands.

Additionally, in at least some embodiments in which there is normalization (harmonization) of online (internet) content metadata to suit existing requirements established for commercial content, it is possible to further drive efficiencies by allowing these online content types to be assimilated for use by a commercial content VOD system with minimal changes required to other components in the system (e.g., recommenders, storefront catalogs, etc. that are driven by metadata can reason on and use the normalized metadata associated with the online content in the same or substantially similar manner). Also, in a least some implementations, the content distribution system allows a cable operator or other content distributor to gather analytics about subscriber interests in content outside of the cable ecosystem via explicit request APIs, even if that user's request has insufficient demand to actually fulfill it for free (without this capability, users might simply watch content online where the cable operator cannot track behaviors).

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method for presenting online content in a video-on-demand service, the method comprising:
   receiving identifying information of a plurality of online media content items;
   receiving trend statistical information relating to the plurality of online media content items;
   determining a lifetime value for each of the plurality of online media content items based at least in part on the trend statistical information;
   generating a ranked list of online media content items that includes the plurality of online media content items based at least in part on the trend statistical information;
   causing at least a portion of the ranked list to be provided to the video-on-demand service;
   receiving, from the video-on-demand service, information indicating that a subset of the online media content items from the ranked list have been ingested by the video-on-demand service;
   obtaining, for each of the subset of online media content items that have been ingested, updated trend statistical information;
   determining, for each of the subset of online media content items, an updated lifetime value based on the updated trend statistical information;
   updating the ranked list of online media content items based at least in part on the updated trend statistical information; and
   causing at least a portion of the updated ranked list to be provided to the video-on-demand service.

2. The method of claim 1, wherein the trend statistical information includes at least one of: real-time feed information, aggregate trend information from one or more social networking websites, real-time usage statistics, trend tracking service information, and viral video tracking information.

3. The method of claim 1, further comprising:
   obtaining, for each of the plurality of online media content items, metadata relating to the online media content item;
   normalizing, for each of the plurality of online media content items, the metadata relating to the online media content item using a predetermined format; and
   wherein generating the ranked list further comprises ranking the plurality of online media content items based at least in part on the normalized metadata associated with each online media content item.

4. The method of claim 1, further comprising:
   receiving information indicating that the video-on-demand service received an express demand request for a first online media content item of the plurality of online media content items from a user portal; and
   wherein generating the ranked list further comprises ranking the plurality of online media content items based at least in part on the indication that the video-on-demand service received the express demand request for the first online media content item.

5. The method of claim 1, wherein the ranked list of online media content items comprises at least one link reference associated with a media content item in the ranked list, wherein the at least one link reference indicates a location at which a portion of the media content item is available.

6. The method of claim 5, wherein the lifetime value associated with the media content item is determined by analyzing the at least one link reference of the media content item.

7. The method of claim 1, further comprising:
   receiving a preference of a user of the video-on-demand service; and
   wherein generating the ranked list further comprises ranking the plurality of online media content items based at least in part on the preference of the user of the video-on-demand service.

8. A system for presenting online content in a video-on-demand service, the system comprising:
   a hardware processor that is programmed to:
      receive identifying information of a plurality of online media content items;
      receive trend statistical information relating to the plurality of online media content items;
      determine a lifetime value for each of the plurality of online media content items based at least in part on the trend statistical information;

generate a ranked list of online media content items that includes the plurality of online media content items based at least in part on the trend statistical information;

cause at least a portion of the ranked list to be provided to the video-on-demand service;

receive, from the video-on-demand service, information indicating that a subset of the online media content items from the ranked list have been ingested by the video-on-demand service:

obtain, for each of the subset of online media content items that have been ingested, updated trend statistical information;

determine, for each of the subset of online media content items, an updated lifetime value based on the update trend statistical information;

update the ranked list of online media content items based at least in part on the updated trend statistical information; and cause at least a portion of the updated ranked list to be provided to the video-on-demand service.

9. The system of claim 8, wherein the trend statistical information includes at least one of: real-time feed information, aggregate trend information from one or more social networking websites, real-time usage statistics, trend tracking service information, and viral video tracking information.

10. The system of claim 8, wherein the hardware processor is further programmed to:

obtain, for each of the plurality of online media content items, metadata relating to the media content item;

normalize, for each of the plurality of online media content items, the metadata relating to the online media content item using a predetermined format; and rank the plurality of online media content items based at least in part on the normalized metadata associated with each online media content item.

11. The system of claim 8, wherein the hardware processor is further programmed to:

receive information indicating that the video-on-demand service received an express demand request for a first online media content item of the plurality of online media content items from a user portal; and rank the plurality of online media content items based at least in part on the indication that the video-on-demand service received the express demand request for the first online media content item.

12. The system of claim 8, wherein the ranked list of online media content items comprises at least one link reference associated with a media content item in the ranked list, wherein the at least one link reference indicates a location at which a portion of the media content item is available.

13. The system of claim 12, wherein the lifetime value associated with the media content item is determined by analyzing the at least one link reference of the media content item.

14. The system of claim 8, wherein the hardware processor is further programmed to:

receive a preference of a user of the video-on-demand service; and rank the plurality of online media content items based at least in part on the preference of the user of the video-on-demand service.

15. A non-transitory computer-readable medium containing computer-executable instructions that, when executed by a processor, cause the processor to perform a method for presenting online content in a video-on-demand service, the method comprising:

receiving identifying information of a plurality of online media content items;

receiving trend statistical information relating to the plurality of online media content items;

determining a lifetime value for each of the plurality of online media content items based at least in part on the trend statistical information;

generating a ranked list of online media content items that includes the plurality of online media content items based at least in part on the trend statistical information;

causing at least a portion of the ranked list to be provided to the video-on-demand service;

receiving, from the video-on-demand service, information indicating that a subset of the online media content items from the ranked list have been ingested by the video-on-demand service;

obtaining, for each of the subset of online media content items that have been ingested, updated trend statistical information;

determining, for each of the subset of online media content items, an updated lifetime value based on the updated trend statistical information;

updating the ranked list of online media content items based at least in part on the updated trend statistical information; and causing at least a portion of the updated ranked list to be provided to the video-in-demand service.

16. The non-transitory computer-readable medium of claim 15, wherein the trend statistical information includes at least one of: real-time feed information, aggregate trend information from one or more social networking websites, real-time usage statistics, trend tracking service information, and viral video tracking information.

17. The non-transitory computer-readable medium of claim 15, wherein the method further comprises:

obtaining, for each of the plurality of online media content items, metadata relating to the online media content item;

normalizing, for each of the plurality of online media content items, the metadata relating to the online media content item using a predetermined format; and wherein generating the ranked list further comprises ranking the plurality of online media content items based at least in part on the normalized metadata associated with each online media content item.

18. The non-transitory computer-readable medium of claim 15, wherein the method further comprises:

receiving information indicating that the video-on-demand service received an express demand request for a first online media content item of the plurality of online media content items from a user portal; and wherein generating the ranked list further comprises ranking the plurality of online media content items based at least in part on the indication that the video-on-demand service received the express demand request for the first online media content item causing the one of the plurality of media content items to be presented in the video-on-demand service based on the express demand request.

19. The non-transitory computer-readable medium of claim 15, wherein the ranked list of online media content items comprises at least one link reference associated with a media content item in the ranked list, wherein the at least one link reference indicates a location at which a portion of the media content item is available.

20. The non-transitory computer-readable medium of claim 19, wherein the lifetime value associated with the media content item is determined by analyzing the at least one link reference of the media content item.

21. The non-transitory computer-readable medium of claim 15, wherein the method further comprises:
   receiving a preference of a user of the video-on-demand service; and
   wherein generating the ranked list further comprises ranking the plurality of online media content items based at least in part on the preference of the user of the video-on-demand service.

* * * * *